Sept. 18, 1928.
E. GUERRERO ET AL
1,684,916
DIRECTION INDICATOR FOR AUTOMOBILES
Filed March 12, 1927
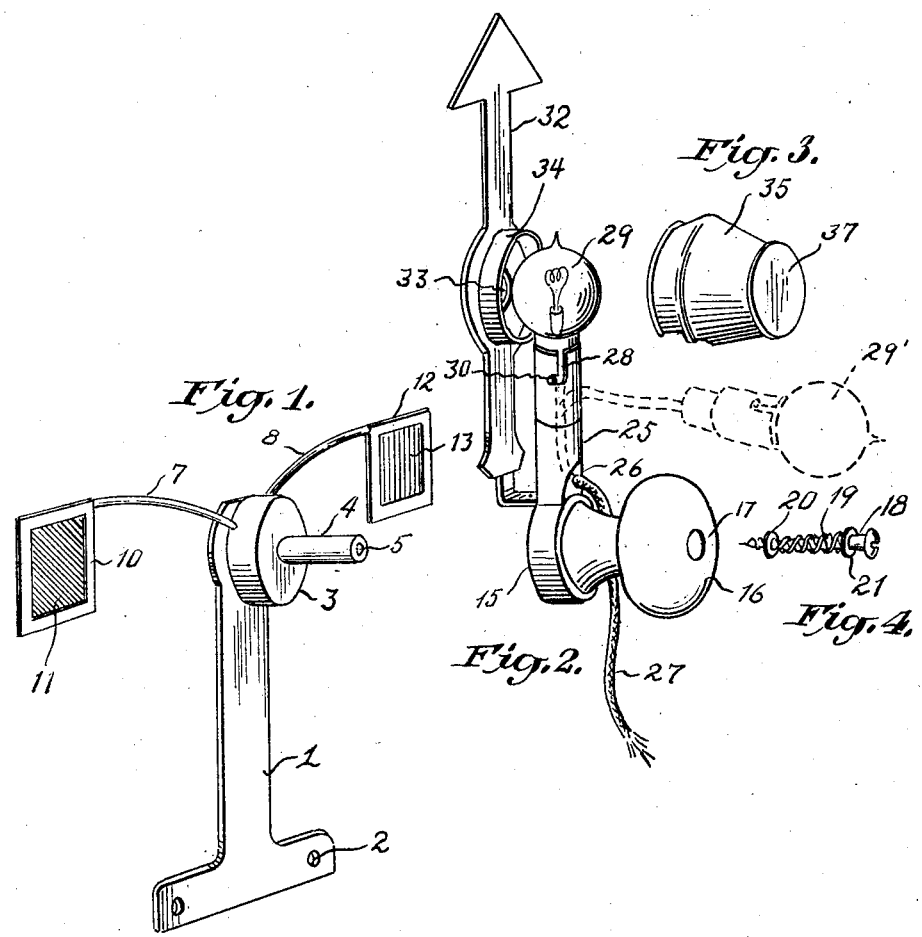
INVENTORS:
E. Guerrero and
J.A. Grey
BY
ATTORNEYS.

Patented Sept. 18, 1928.

1,684,916

UNITED STATES PATENT OFFICE.

ENRIQUE GUERRERO AND JOHN A. GREY, OF QUITO, ECUADOR.

DIRECTION INDICATOR FOR AUTOMOBILES.

Application filed March 12, 1927, Serial No. 174,951, and in Ecuador April 20, 1926.

This invention relates to a direction indicator to be attached to the front dash board of an automobile in a position to be conveniently operated by the hand of the driver so that he can indicate to any one in front of the automobile when he gets to a certain point whether the automobile will turn to the right or to the left or continue its forward motion.

It is an object of the invention to produce a device easily operable by the automobile driver, having as few parts to get out of order as possible, to perform the functions indicated and that can be easily taken apart for repairs or lubrication.

With these and other objects in view which will appear as the description proceeds, we will now describe our invention in connection with the accompanying drawing in which, Figure 1 is a view of the bracket for supporting the parts of our signal, Figure 2 is a view in perspective showing the knob and connected parts of our signal, Figure 3 is a view of the lamp cap, and Figure 4 is a screw and spring for attaching the knob and bracket and preventing these parts from working loose by wear showing the parts in perspective and slightly separated, but in position to be easily assembled.

Our signal comprises a bracket 1 with the holes 2 therein adapted to receive the attaching screws for attaching it to the dash board of an automobile. The bracket 1 has attached thereto a cylindrical portion 3 with a smaller cylindrical projection 4 extending therefrom, the projection 4 having a screw hole 5 in its end. Between the cylindrical portion 3 and the bracket 1 is clamped two arms 7 and 8, the arm 7 carrying at its end a frame 10 enclosing a colored glass 11. The arm 8 carries a similar frame 12 having therein a differently colored glass 13; these glasses being clamped between the bracket and the cylindrical portion 3 are held stationary thereby.

Fitting over the cylindrical portion 3 is a cup-shaped portion 15 having attached thereto a knob or handle 16 with a hole 17 extending axially thereof through which a screw 18 may extend. We preferably provide a spring 19 surrounding said screw with washers 20 and 21 on the screw. It is apparent when the screw 18 is passed through the hole 17, it can enter the hole 5 in the cylindrical portion 4 and hold the knob and cup-shaped portion 15 in cooperative position with the cylindrical portion 3 the spring 19 will prevent the knob and bracket from working loose.

Extending from the knob or handle 16 is a rigid cylindrical bracket 25 having a hole 26 at its lower end through which ordinary current conductors 27 may extend. The cylindrical portion 25 may conveniently have a bayonet slot 28 therein and a bulb 29, having a cylindrical portion, may be fitted into the portion 25, a lug 30 cooperating with the bayonet slot to firmly hold the bulb in the cylindrical socket portion 25. The bulb is shown at 29' in dotted line position withdrawn from its socket.

Back of the bulb and socket we conveniently attach a signal 32 having a hole 33 therein and a cylindrical portion 34 rigid with the signal 32. We also provide a cap 35 having a cylindrical base adapted to fit over the cylindrical portion 34, and this cap may be provided with a glass covered opening 37. The cylindrical portion 34 of the signal is shown in the drawings as detached from the cap 35, but in use the cap fits over the cylindrical portion 34 and encloses the bulb 29 except for the hole 33 and the glass covered opening 37.

In practice, when the automobile driver gets to a corner, if he has to continue straight on in his course, the signal including the bulb will be turned in an upright position. If the driver expects to turn to the right he will turn the bulb and signal to the right and in front of the glass 13 to indicate to any one in front of the automobile that he is to turn to right at the corner. If the driver expects to turn to the left he will grasp the handle 16 and turn the signal to the left so that the bulb will shine through the opening 33 and the glass 11 and thus indicate that the automobile is to turn to the left.

We claim as our invention:

1. An automobile signal comprising a bracket with provisions for attaching it to the dash board of an automobile, said bracket carrying a cylindrical portion with right and left hand colored glasses attached thereto, a handle having at its end a cup-shaped portion to fit over said cylindrical portion, and means to hold the handle rotatably over the cylindrical portion, said handle having rigidly attached thereto a signal comprising an arm with a cylindrical portion on its face, and a bulb socket rigidly held in front of the arm, the signal having a hole therethrough, a cap, the cylindrical portion being adapted to receive the lower end of the cap to enclose the bulb.

2. An automobile direction signal comprising a bracket, right and left hand arms extending therefrom each carrying a colored glass at their ends, a cylindrical portion rigid with the bracket, and a handle with a cup-shaped portion adapted to fit over said cylindrical portion and to turn thereon, said handle portion carrying a bulb socket and bulb and a signal arm rigidly attached thereto, said arm having a cylindrical portion and a cap to fit over the cylindrical portion and to enclose the bulb, the handle, bulb and signal being rigidly attached to each other whereby the handle may be turned on the cylindrical portion of the bracket to bring the bulb in front of the left or right hand glass on the bracket.

In testimony whereof we affix our signatures.

ENRIQUE GUERRERO.
JOHN A. GREY.